July 16, 1940.  C. A. WICKER  2,208,484
TANDEM WHEEL CONSTRUCTION
Filed June 7, 1939  2 Sheets-Sheet 2
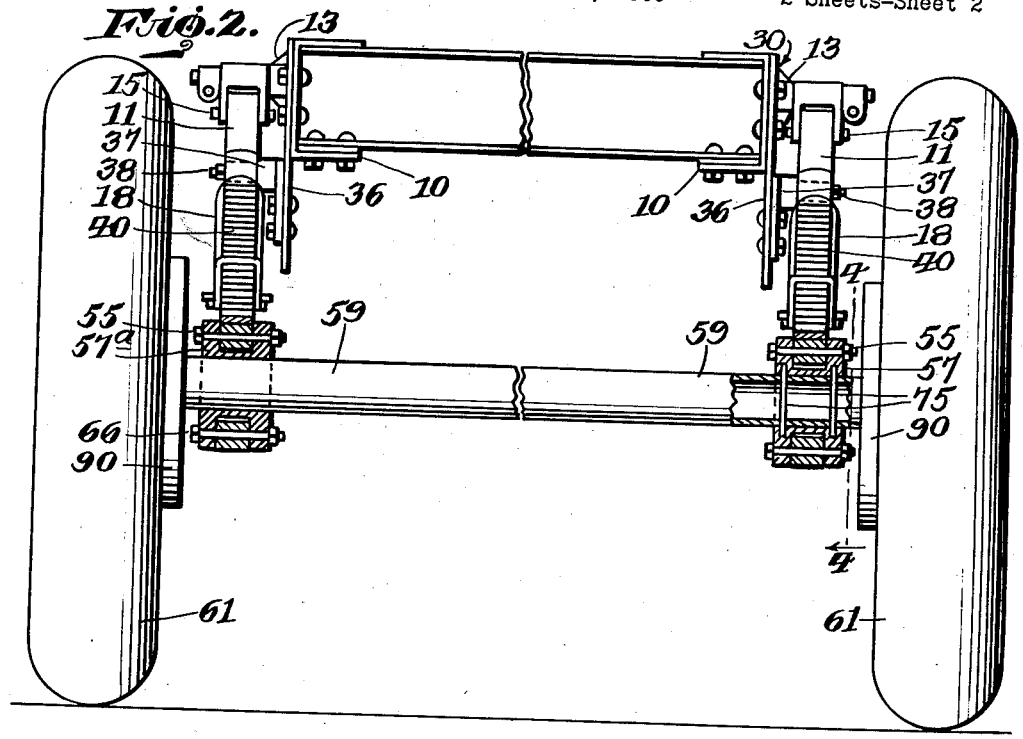
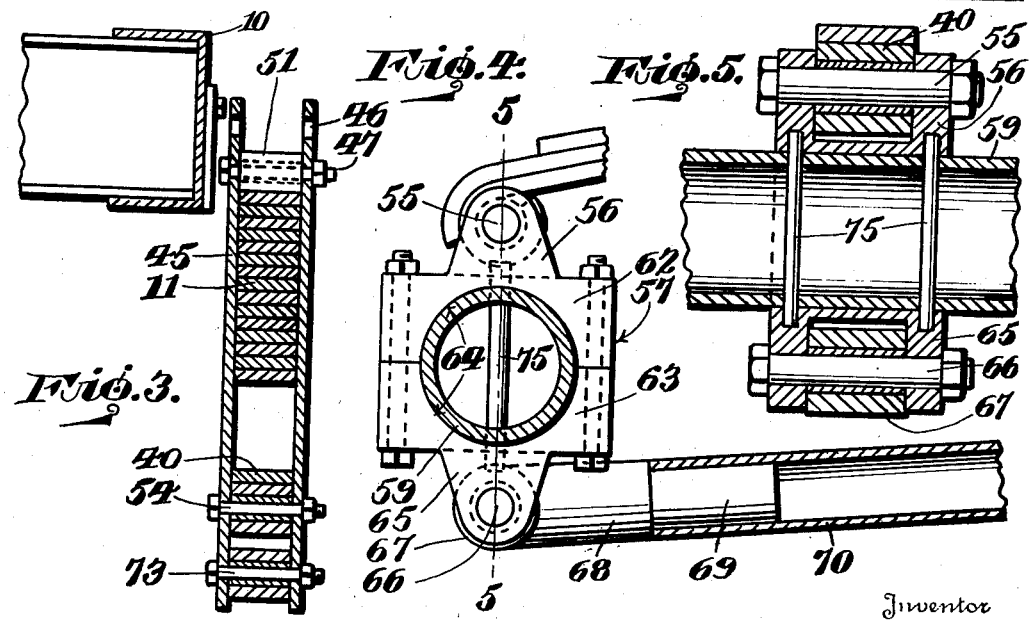
Inventor
Charles A. Wicker Patented July 16, 1940

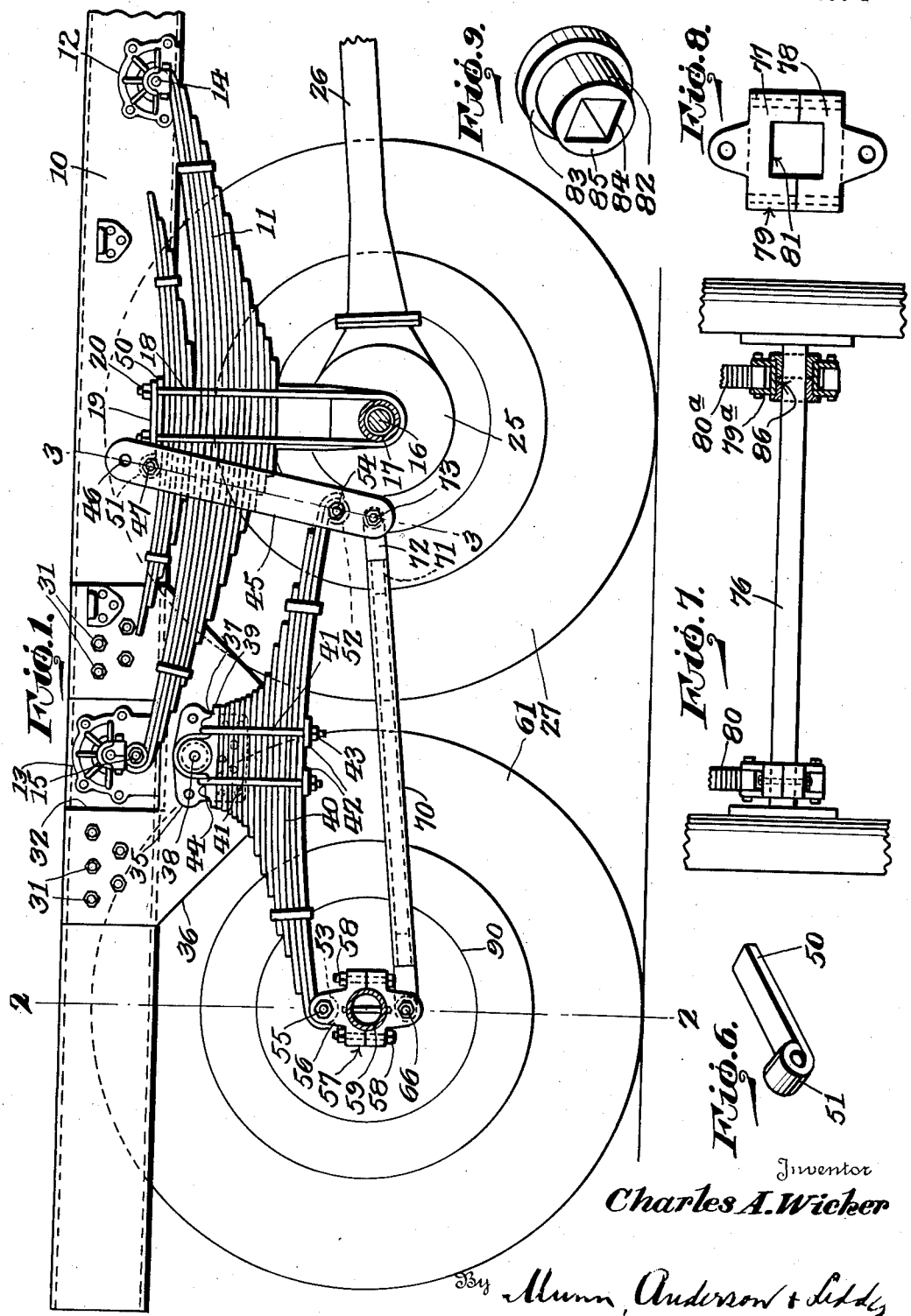

2,208,484

UNITED STATES PATENT OFFICE 2,208,484

TANDEM WHEEL CONSTRUCTION

Charles A. Wicker, Selma, Ala.

Application June 7, 1939, Serial No. 277,946

3 Claims. (Cl. 280—124)

This invention relates to auxiliary wheel suspensions for vehicles.

An object of the invention is the provision of a spring suspension for tandem wheel constructions in which the load of the vehicle at the rear axle will be distributed between more than the customary two wheels whereby an equalizing effect is had and whereby a greater load may be carried by the vehicle with a consequent saving on the tires by the elimination of sliding and with a consequent ease in steering.

Another object of the invention is the provision of a tandem wheel construction for vehicles in which the load of the vehicle is not only distributed over four tires instead of two, but the construction is such that the vehicle will be able to turn curves without the usual sliding of the tires thus eliminating tire wear and facilitating the steering of the vehicle because when the vehicle turns a curve the same will lean to the outside of the curve whereby the outer springs will expand while the springs at the inside of the vehicle will contract with a consequence that the load is maintained in equilibrium and there is no tendency at any time to swing the body outwardly due to the fact that the body will assume a predetermined position by the compensating effect of the springs.

A further object of the invention is the provision of the tandem wheel construction in which the spring suspension of the auxiliary wheels have cooperative connections with the spring suspension of the main rear wheels and in which one of the springs of the auxiliary wheels will have a rocking connection with the axle or axle housing supporting the auxiliary wheels while the other spring will be rigidly connected with the axle or axle housing to compensate for variations in the movement of the springs when turning corners or when traveling over an uneven roadbed.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claims.

In the drawings:

Figure 1 is a side view in elevation of a tandem wheel construction, the tandem wheel assembly being constructed in accordance with the principles of my invention.

Figure 2 is a transverse vertical section taken along the line 2—2 of Figure 1.

Figure 3 is a transverse vertical section taken on the line 3—3 of Figure 1.

Figure 4 is a fragmentary longitudinal view taken along the line 4—4 of Figure 2.

Figure 5 is a transverse vertical section taken along the line 5—5 of Figure 4.

Figure 6 is a view in perspective of a plate and bearing aiding in supporting one end of the auxiliary springs.

Figure 7 is a rear view of the auxiliary wheel construction partly in section showing a modified form of the invention.

Figure 8 is a view in perspective of a sleeve adapted to be received by a square axle to which is connected one end of the vehicle spring.

Figure 9 is an end view of a split connection adapted to be employed for connecting one end of the other auxiliary spring to a square axle.

Referring more particularly to the drawings, 10 designates a beam of the chassis of a truck which is normally supported by compound leaf springs 11. Brackets 12 and 13 are secured in spaced relation to the beam 10 and the ends of the leaf springs are supported on bolts 14 and 15 suspended respectively from the brackets 12 and 13 at each side of the frame.

The axle 16 is located within an axle housing 17. The springs 11 are clamped to the axle housing 17 by means of U-bolts 18 and a bridging plate 19. Nuts 20 secure the bolts in position with respect to the bridging plate 19.

A differential housing 25 contains the usual differential for driving the rear axles of which one designated by the numeral 16 is shown and a drive shaft housing 26 extends from the differential housing 25.

Rear wheels 27 are mounted on the rear axles and in this case aid in supporting the load at the rear of the truck.

All of the elements just described are standard equipment on vehicles of this type and form no part of the present invention.

A V-shaped plate 30 is secured at 31 to the beam 10 at each side of the frame and has a cut-out portion, as shown at 32, to receive the bracket 13. Thus the plate 30 is located rearwardly of the standard axle housing 17.

A bracket 35 is secured in any approved manner to the pending portion 36 of the plate 30 at the outer face thereof and is provided with a bearing 37 which receives a bolt 38 upon which is mounted a hanger 39 for a compound leaf spring 40.

The hanger 39 is connected to the leaf spring 40 by means of U-bolts 41, perforated bars 42 and nuts 43. The hanger 39 is provided with notches 44 which receive the bights of the U-bolts 41.

A pair of straps 45 are provided with a plurality of perforations 46 at the upper ends thereof to receive a bolt 47. The plurality of perforations 46 permits the adjustment of the straps so that said straps may be raised or lowered when required.

A plate 50 is provided with a sleeve 51 at one end and this sleeve receives the bolt 47 whereby the straps 45 are suspended from said bolt. It will be noted that the plate 50 is clamped to the upper face of the compound leaf spring 11 by means of the U-bolts 18, the plate 19 and the nuts 20.

The opposite ends of the spring 40 are provided with sleeves 52 and 53. The sleeve 52 is adapted to receive a bolt 54 carried by the lower ends of the straps 45 while the sleeve 53 is adapted to receive a bolt 55 carried by bearings 56 projecting from the sections of a split ring or block, generally designated by the numeral 57. The split ring has its sections bolted together as shown at 58 on an auxiliary rear axle or housing 59 in which may be mounted an axle when wheels 61 are driven by the customary differential.

The wheels 61 are loosely mounted on the axle 59 and are free to revolve on this axle and support the axle in the usual manner. The wheels 27, however, in this form are driven in the usual manner.

Referring more particularly to Figure 2, it will be seen that the shackle 57ª at the left hand side is slightly different from the shackle or split ring 57 at the right hand side. Each of the shackles are formed of two members 62 and 63 which are substantially identical in construction and each section is provided with a semi-circular portion 64 to neatly receive the axle or housing 59.

The lower section 63 is also provided with a bearing in the form of a pair of spaced ears 65 for supporting a pin 66. This pin is received by a bearing 67 formed at one end of a connecting member 68 which has a reduced portion 69 welded to the inner walls of a hollow rod 70. This rod extends at an acute angle to a horizontal plane passing through the pin 66 and the opposite end of this rod is rigidly connected to an inserted end 71 formed on a connecting member 72. This connecting member is provided with a bearing to receive a pin 73 carried by the lower ends of the straps 45 and below the pin 54. A pair of dowel pins 75 are inserted through openings in the axle 59 and likewise through openings in the sections 62 and 63 and these pins project slightly beyond the opposite ends of the member 59 for rigidly securing the members 62 and 63 to the axle or housing 59.

A careful inspection of Figure 2 will show that the pins 75 are absent from the bearing block 57ª so that this block may slightly rock on the axle or housing 59 for a purpose which will be presently explained.

Instead of cylindrical axles shown in Figures 1 to 5, inclusive, the axle as shown at 76 (Fig. 7) may be rectangular in cross section and in this event the sections 77 and 78 of the connecting means 79 between the axle and the vehicle spring 80 will have a rectilinear opening generally designated by the numeral 81 to neatly receive the axle so that when the sections are clamped together the member 79 will not rock on the axle but will be rigidly secured thereto as shown at the left hand side in Figure 7.

On the right hand side, however, the opening in the split bearing block 79ª is circular and this circular opening receives a pair of sleeves 82 which have shoulders or ribs 83 at their outer ends and a square opening 84 located centrally thereof. The inner ends 85 of these sleeves as shown in Figure 7 are in abutting relation while the shoulder or ribs 83 will abut the side walls of the block 79ª having the central opening 84. The sleeves 82 may be held in a predetermined position on the axle 72 in any approved manner. By this construction the bearing block 79ª may rock on the cooperative sleeves during expansion or contraction of the vehicle spring 80ª.

When it is desired to positively drive the wheels 61 through the usual drive shaft connected with the engine of the vehicle an axle similar to that shown at 16 in Figure 1 will be located within the axle housing 59 and in that event one of the bearing blocks 57 or 57ª is rigidly connected with the axle housing in any approved manner.

The brake system, whatever type employed, will operate on the brake drums 90 of the wheels 61.

It has been found that the standard tires are not capable of supporting extreme loads indicated by the manufacturer because these tires wear out very rapidly or blow out whereby considerable expense is had in ordinary trucks along various types of roads. Furthermore, in order to distribute the load and to relieve the tires of the strain auxiliary axles have been employed in connection with auxiliary wheels for aiding and supporting the load, but due to the lack of flexibility in the types of construction now on the market, a great wear on the tires is not obviated.

In the present construction the load is not only evenly distributed on all four tires, but the particular spring suspension for the auxiliary axle and supplemental wheels, relieves the wear and tear on the tires by preventing skidding or sliding and the load is more equally distributed on all of the tires.

In the operation the auxiliary wheels 61 are connected not only to the channel beams 10 of the vehicle but they have a flexible connection with the main compound leaf springs 11 through the straps or shackles 45, particularly where the auxiliary springs 40 are partly supported by said shackles. These springs while being permitted to swing are limited in their swinging movement by the connections through the rods 70.

One of the wheels 61 may be elevated without disturbing the position of the associated wheel and rocking of the rear axle is also compensated for by the fact that the member 57ª is permitted to rock on the axle while the other member 57 is secured to the axle.

When the wheels are raised the rear ends of the springs 40 are likewise raised and the shackles 45 swing forwardly and since the springs 40 are supported at their ends by the springs 11, not only the resilience of the springs 40 come into play but the springs 11 also operate to maintain the proper balance between the wheels 27 and 61.

This is also true when the wheels 27 meet with an obstruction whereby said wheels are elevated and the reaction caused by the elevation of the wheels is imparted in a flexible manner to the rear wheels 61.

In view of the fact that brakes are employed in connection with the auxiliary wheels 61 the axle 59 must be held against movement and since the dowel pins 75 hold the axle against motion the auxiliary wheels will likewise be held when the brakes are applied, although a certain amount of flexibility is provided since the bearing block 57ª is permitted rocking movement on the axle and this is also true of the construction shown in Figure 7.

In turning a curve, the vehicle swings to the outside of the curve which causes the outside spring 40 to expand while the inside spring contracts, thereby increasing the space between the outside wheels while decreasing the space between the inside wheels, expansion and contraction being necessary between the wheels of the pulling unit and the tandem unit.

When one of the wheels enters a depression or moves over an elevation there is always expansion and contraction of the vehicle springs and this expansion and contraction is compensated for by the rocking of the straps 45 through the members 70 and by the rocking of the member 57ª or 80ª. This rocking movement of these members gives a certain amount of flexibility even though the other member 57 or 80 is held against movement.

I claim:

1. An attachment for trucks to provide a tandem wheel construction comprising an auxiliary axle, wheels on the axle, a pair of leaf springs, means rigidly connected with one end of the axle and having pivotal connection at one side of the axle with one end of one spring, means rockably mounted on the other end of the axle and having pivotal connections with a similarly disposed end of the other spring, shackles adapted to be pivotally suspended at one end from a part of the truck, rods rigidly connecting both means on the axles to the other ends of the shackles and at diametrically opposite points from the spring connections, means pivotally connecting the other ends of the springs to intermediate portions of said shackles, and means for supporting the springs from the truck.

2. An attachment for trucks to provide a tandem wheel construction comprising an auxiliary axle, wheels on the axle, an auxiliary spring adjacent each wheel and projecting forwardly of the axle, means rigid with one end of the axle for pivotally connecting one end of one spring with the axle, means rockable on the other end of the axle for pivotally connecting one end of the other spring with the axle, means adapted to swingably mount the other ends of the springs on the truck, means located below the axle and each of the springs rigidly connecting the rigid means and the rockable means on the axle with the swingable means, and means adapted to connect intermediate portions of the springs with the frame of the truck.

3. A tandem wheel construction for trucks having leaf springs connecting the usual rear axle housing to the chassis frame comprising a unit adapted to be removably connected to the rear end of the truck and including an auxiliary axle, a pair of auxiliary leaf springs, a block rigid with one end of the auxiliary axle, means pivotally connecting the outer end of one auxiliary spring with the upper end of the block, a second block rockably mounted on the other end of the auxiliary axle, means pivotally connecting the outer end of the other spring with the upper end of the rockable block, spaced pairs of shackles, a rod each rigidly connecting the lower ends of the blocks with the lower ends of the shackles, means pivotally connecting the inner ends of the auxiliary springs with the lower ends of the shackles but inwardly of the connections between the rods and said shackles, wheels on the ends of the auxiliary axle, means connecting the intermediate portions of the auxiliary springs with the frame, and means pivotally supporting the upper ends of the shackles on the first-mentioned springs.

CHARLES A. WICKER.